United States Patent [19]

Read

[11] 4,320,262
[45] Mar. 16, 1982

[54] TELEPHONE HANDSET WITH INTEGRAL SHOULDER REST

[75] Inventor: Clifford D. Read, Almonte, Canada

[73] Assignee: Northern Telecom Limited, Montreal, Canada

[21] Appl. No.: 123,259

[22] Filed: Feb. 20, 1980

[51] Int. Cl.³ .............................................. H04M 1/02
[52] U.S. Cl. ...................................... 179/103; 179/157
[58] Field of Search ............... 179/100 R, 103, 146 R, 179/147, 157, 178, 179; D14/63, 65

[56] References Cited

U.S. PATENT DOCUMENTS

| | | | |
|---|---|---|---|
| 2,584,807 | 2/1952 | Miller | 179/157 |
| 2,687,452 | 8/1954 | Trank | 179/157 |
| 2,703,824 | 3/1955 | Bowman | 179/157 |
| 2,732,439 | 1/1956 | Garfinkle | 179/157 |
| 3,582,574 | 6/1971 | Grau | 179/157 |
| 4,238,647 | 12/1980 | Maspoli | 179/103 |

*Primary Examiner*—Bernard Konick
*Assistant Examiner*—Randall P. Myers
*Attorney, Agent, or Firm*—John E. Mowle

[57] ABSTRACT

A shoulder rest that forms an integral part of a telephone handset. The rest includes a pair of arms each pivotally connected at one end to the handset body, and a shoulder plate that is pivotally connected between the free ends of the arms. The rest approximates a parallelogram and is spring loaded so that it flips from its folded down position along the handset to its opened up position extending away from the body when a latch on the handset is released.

9 Claims, 4 Drawing Figures

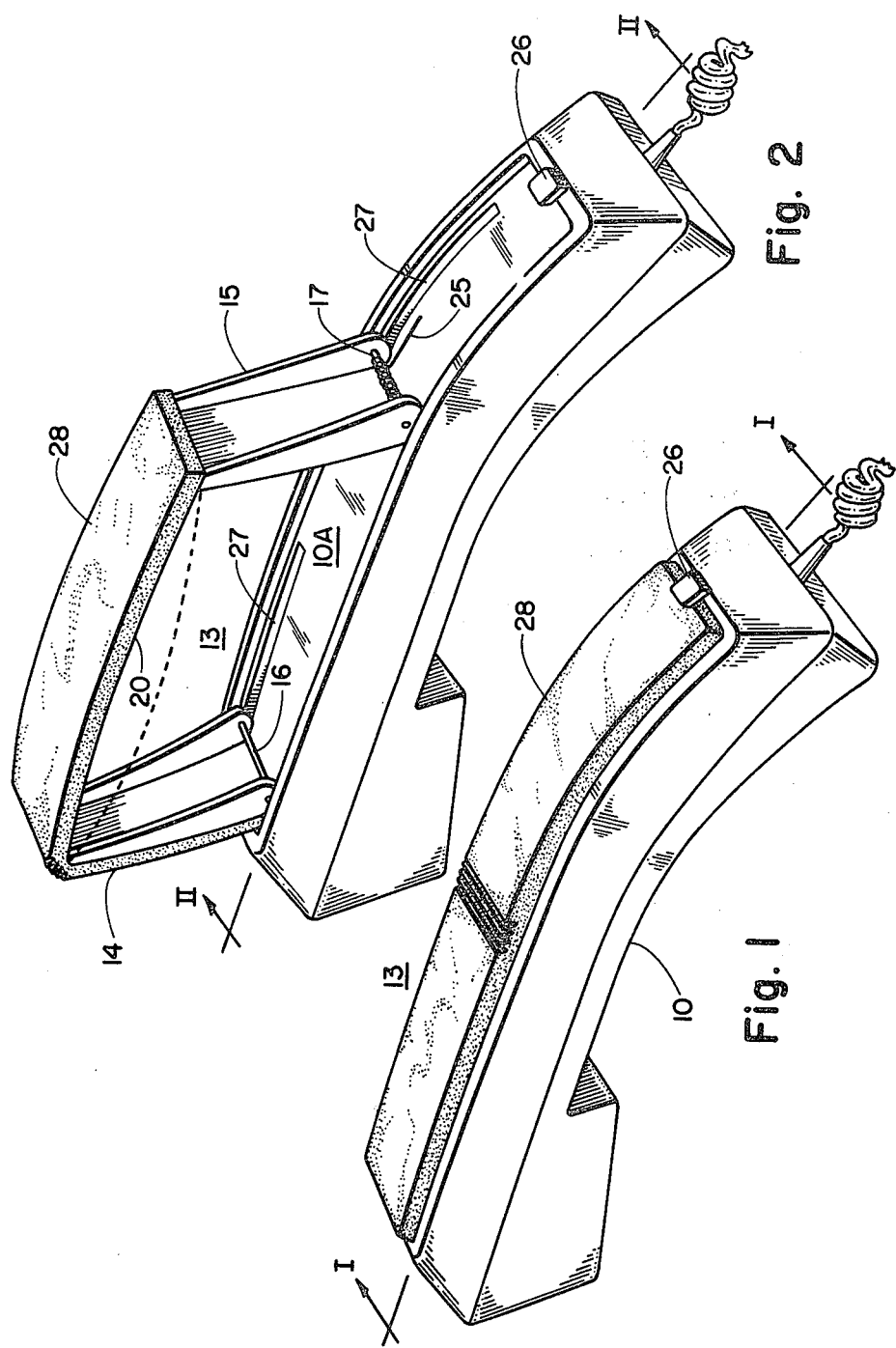

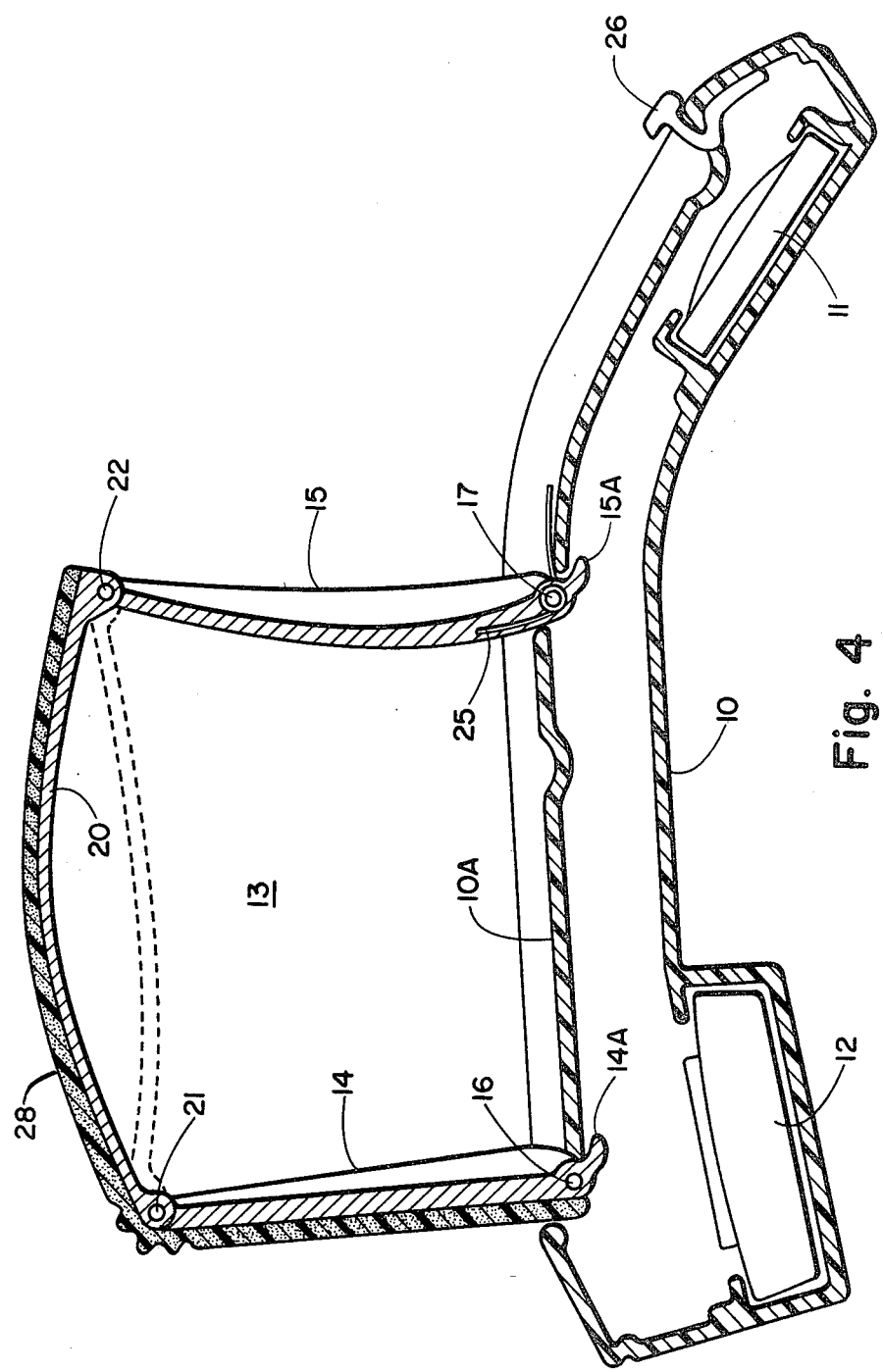

TELEPHONE HANDSET WITH INTEGRAL SHOULDER REST

This invention relates to a shoulder rest that forms an integral part of a telephone handset and more particularly to one which may fold flush with the body of the handset when not in use.

BACKGROUND OF THE INVENTION

It is sometimes convenient when using a telephone to have both hands free to manipulate papers and the like. One very awkward way of accomplishing this with a conventional telephone handset is to simply tilt ones head to cradle the set against ones shoulder.

To avoid this, various shoulder rests that generally clamp onto the handset have been developed in the past. Many of these are fixed units although some fold at least partially down against the handset when not in use. A typical example of the latter is described in U.S. Pat. No. 2,584,807 issued Feb. 5, 1952 for a Telephone Attachment invented by M. J. Miller. Another example is described in U.S. Pat. No. 2,687,452 issued Aug. 24, 1954 for a Telephone Rest invented by L. Trank. Because of their mounting arrangement these units tend to provide only limited surface area support on the shoulder. In addition, because such units are clamped to the handset, they do not usually provide an aesthetically pleasing appearance to a contemporary telephone set. U.S. Pat. No. 3,582,574 issued June 1, 1971 for a Telephone Attachment invented by Mel Grau; discloses in which there is minimal protrusion when folded down. However, it too has only limited surface area support for the shoulder.

STATEMENT OF THE INVENTION

The disadvantages of these prior shoulder rests have been overcome in the present invention which provides a telephone handset comprising a body housing a transmitter and receiver, which is characterized by an integral shoulder rest having a pair of arms each hinged at one end to the body of the handset. Each of the pair of arms is hinged at its other end to a shoulder plate, the arms and the plate forming a foldable unit with the body so as to lie along the body when folded down and to extend away from the body when unfolded.

In a particular embodiment, the arms and the plate approximate a foldable parallelogram with at least a portion of the body of the handset. The plate may be flexible so as to contour to the shape of the shoulder when pressed there against. In addition, the shoulder rest may include a spring biasing at least one of the arms toward the unfolded or open position. Each of the arms may include a stopper to prevent movement beyond the unopened position. Also, the shoulder rest may include a pad that extends along the shoulder plate and one of the arms so that in the folded down position, the pad provides a continuous cover over the plate and arm. This provides an aesthetically pleasing appearance to the shoulder rest when not in use.

BRIEF DESCRIPTION OF THE DRAWINGS

An example embodiment of the invention will now be described with reference to the accompanying drawings in which:

FIG. 1 and 2 are prespective views of a telephone handset showing an integral shoulder rest in folded and unfolded positions respectively;

FIGS. 3 and 4 are cross-sectional views of FIGS. 1 and 2 taken along the lines I—I and II—II respectively.

DESCRIPTION OF THE PREFERRED EMBODIMENT

Figure 3:
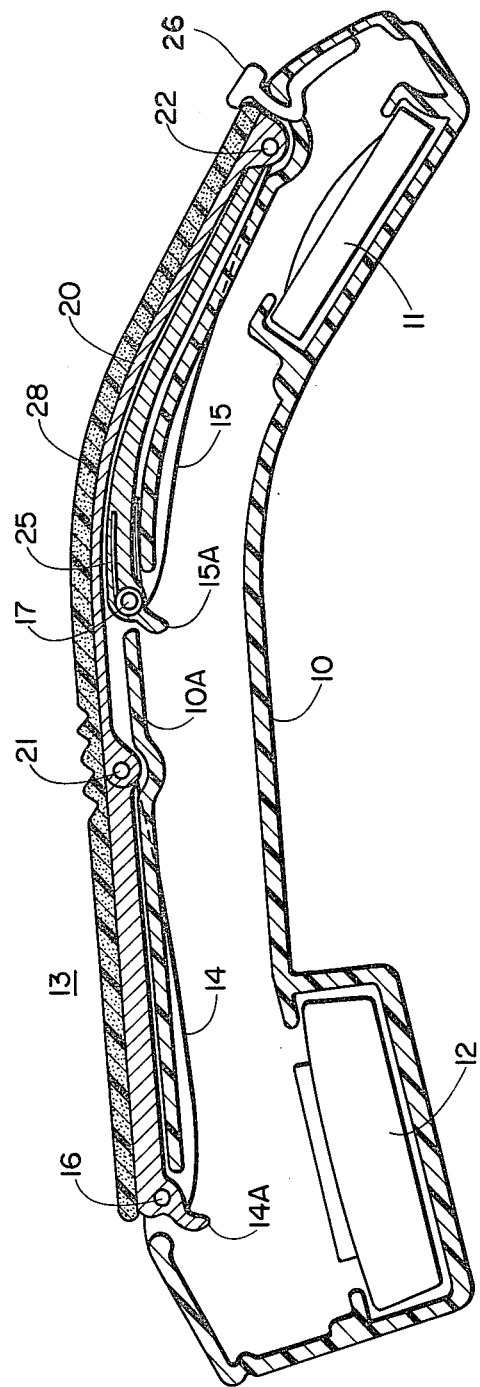

Referring to FIGS. 1 to 4, the telephone handset comprises a body 10 housing a transmitter 11 and a receiver 12. A shoulder rest, generally 13, which is integral with the body 10 includes a pair of arms 14 and 15 hinged at one end by pins 16 and 17 respectively to the body 10. Each of the pair of arms 14 and 15 is hinged at its other end to a flexible shoulder plate 20 by pins 21 and 22 respectively. The arms 14 and 15 and the plate 20 together with a portion 10a of the body approximate a foldable parallelogram so as to lie along the body in a closed position as shown in FIG. 1 and to extend away from the body in an opened up position as shown in FIG. 2.

The shoulder rest 13 also includes a spring 25 which biasses the arm 15 towards the open position. In addition, each of the arms 14 and 15 includes a stopper 14a and 15a which prevents movement of the arms beyond its open position. A release button 26 provides a latch for retaining the arm 15 in the folded position against the bias of the spring 25. Actuation of the release button 26 allows the shoulder rest 13 to flip from the folded position as shown in FIGS. 1 and 3 to the extended or open position as shown in FIGS. 2 and 4.

The body portion 10a is recessed in order that the arms 14 and 15 and plate 20 will lie substantially flush with the balance of the body 10 in the folded position as shown in FIGS. 1 and 3. In addition, the body 10 contains slots 27 to accept the side portions of the arms 14 and 15. These side portions provide added strength with minimal mass to the shoulder rest in a well knwn manner.

As illustrated in FIG. 4, the plate 20 is made of a flexible material such as spring sheet steel or polycarbonate in order to conform to the shape of ones shoulder when pressed there against. In order to prevent slipping and to provide comfort when the rest is in use, a pad 28 is added to the plate 20. This pad 28 is extended along the arm 14 with a highly flexible portion connecting the two parts together so as to allow the shoulder rest to bend at the joint. This provides a pleasing aesthetic appearance when the shoulder rest is in the folded or closed position as shown in FIGS. 1 and 3.

What is claimed is:

1. A telephone handset comprising a body housing a transmitter and a receiver;
   characterized by:
   an integral shoulder rest having a pair of arms each hinged at one end to the body;
   each of the pair of arms is hinged at its other end to a shoulder plate;
   The arms, the plate and at least a portion of the body of the handset forming a foldable parallelogram unit so as to lie along the body when folded down and to extend away from the body when opened up.

2. A telephone handset as defined in claim 1 in which the shoulder plate is flexible so as to contour to the shape of a shoulder when pressed thereagainst.

3. A telephone handset as defined in claim 2 in which the shoulder plate is over the receiver end of the body when the shoulder rest is in an open position, and the transmitter end when in a folded down position.

4. A telephone handset as defined in claim 3 which includes a spring biasing at least one of the arms towards the open position, and in which each of the arms includes a stopper to prevent movement beyond the open position.

5. A telephone handset as defined in claim 4 in which the spring biases the arm disposed towards the transmitter end.

6. A telephone handset as defined in claim 5 which additionally includes a latch for retaining the arm towards the transmitter end in the folded down position against the bias of said spring.

7. A telephone handset as defined in claim 6 in which the body is recessed to store the arms and plate substantially flush with the surface thereof, when in the folded down position.

8. A telephone handset as defined in claim 7 in which each of the arms is channel shaped in cross-section, and in which the body has slots to house the channel sides when in a closed position.

9. A telephone handset as defined in claim 8 which includes a pad that extends along the shoulder plate and one of the arms so that in the closed position, the pad provides a continuous cover over the plate and arm.

* * * * *